Oct. 16, 1962   R. G. McCAMMONT   3,058,605
LOADING AND TRANSPORT OF MINERALS IN MINES AND QUARRIES
Filed May 10, 1960   5 Sheets-Sheet 1
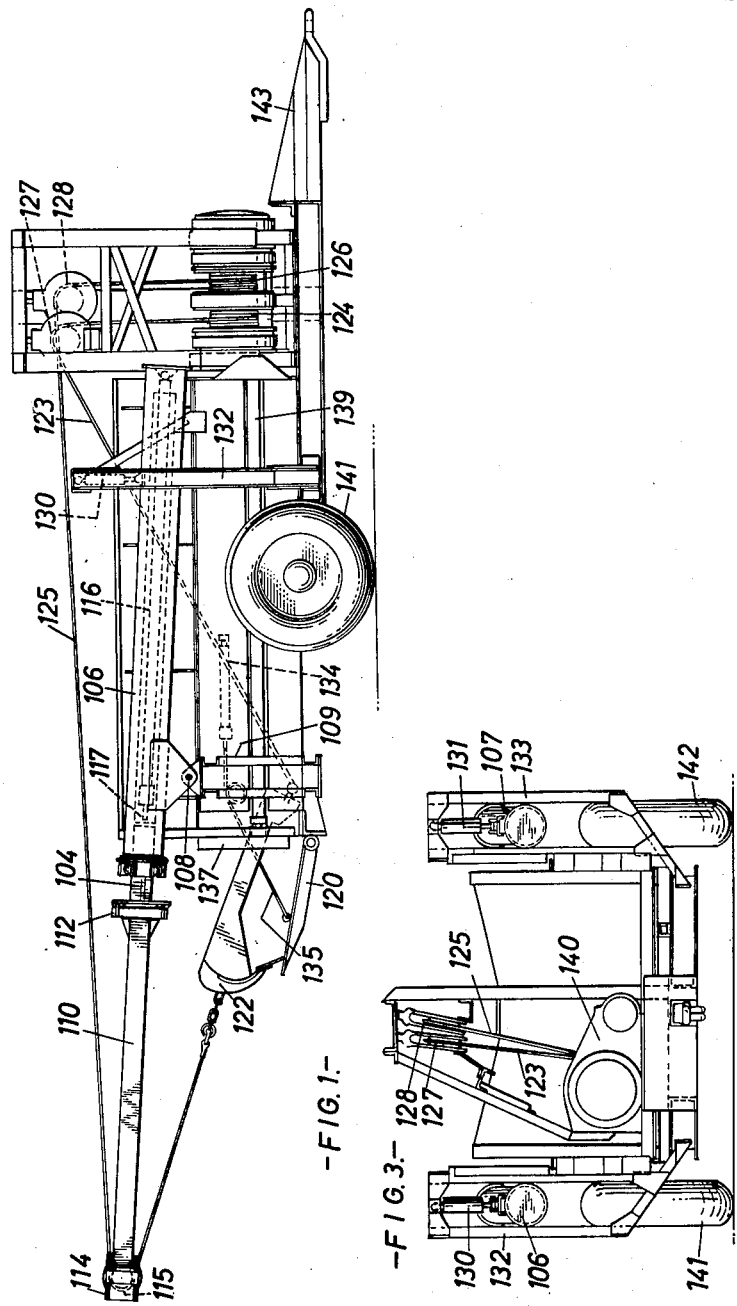
INVENTOR
Robert Gilmour McCammont
BY
Mead, Browne, Schuyler & Beveridge
ATTORNEY

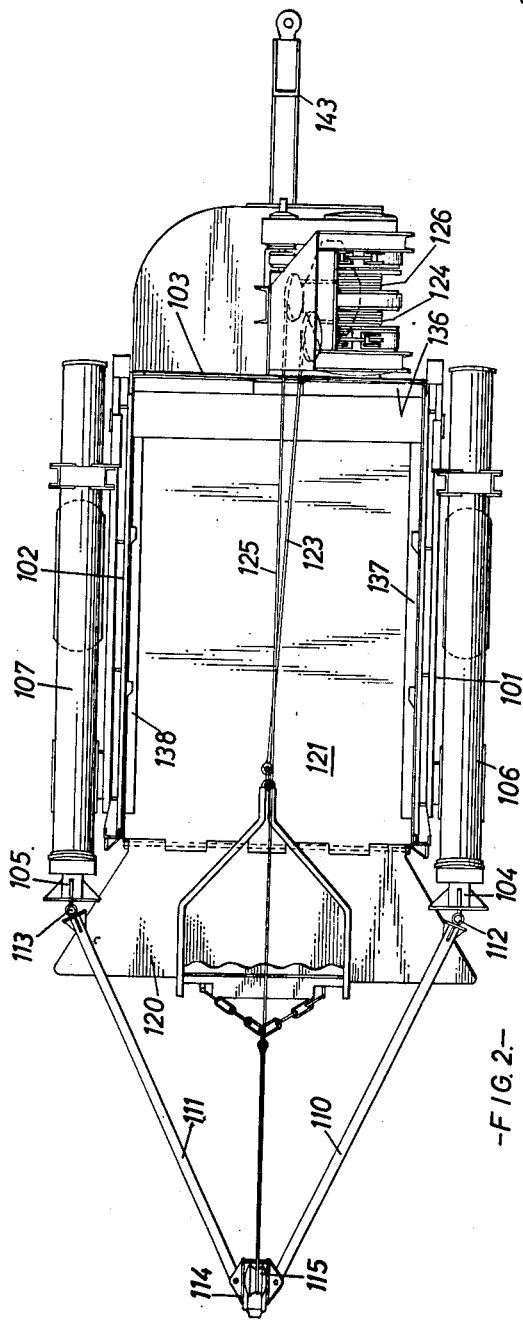

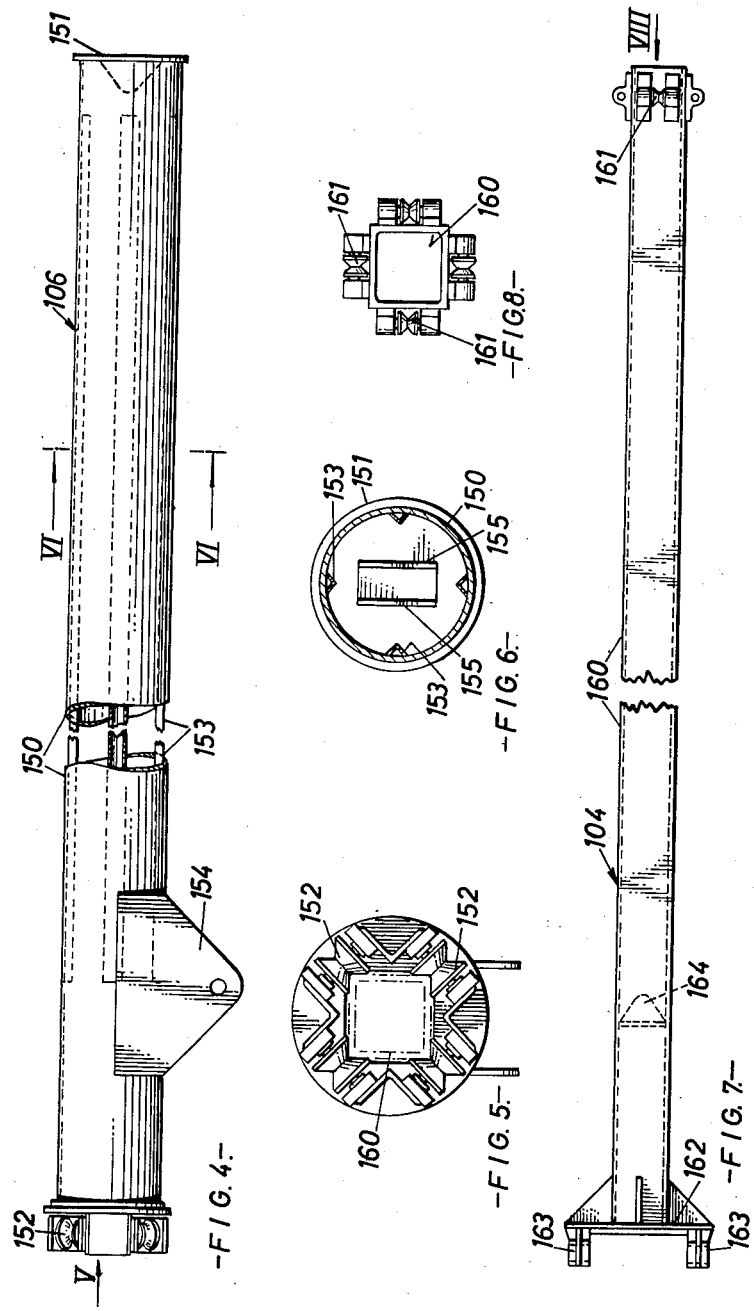

Oct. 16, 1962 R. G. McCAMMONT 3,058,605
LOADING AND TRANSPORT OF MINERALS IN MINES AND QUARRIES
Filed May 10, 1960 5 Sheets—Sheet 4
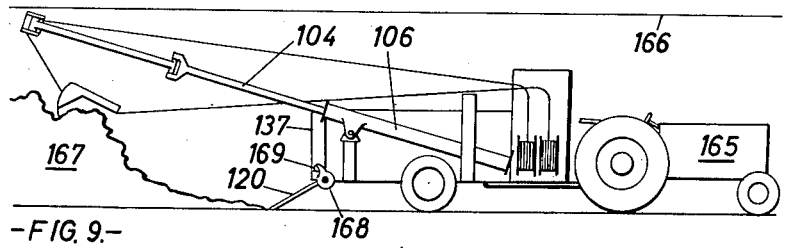
-FIG. 9.-
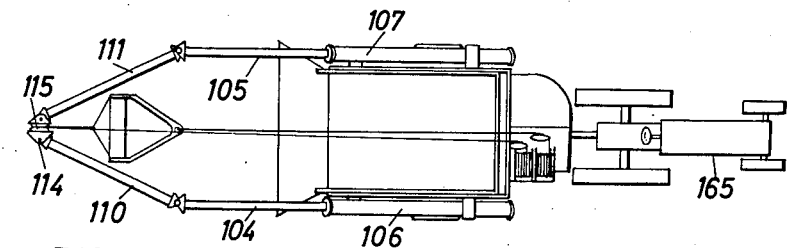
-FIG. 10.-
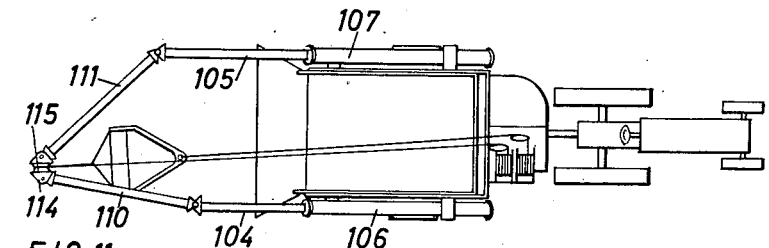
-FIG. 11.-
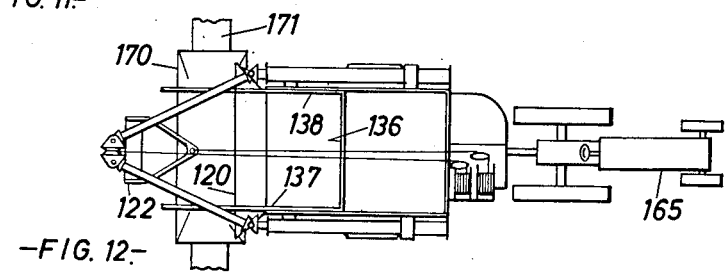
-FIG. 12.-
INVENTOR
Robert Gilmour McCammont
BY
Mead, Browne, Schuyler & Beveridge
ATTORNEY Oct. 16, 1962 R. G. McCAMMONT 3,058,605
LOADING AND TRANSPORT OF MINERALS IN MINES AND QUARRIES
Filed May 10, 1960 5 Sheets-Sheet 5
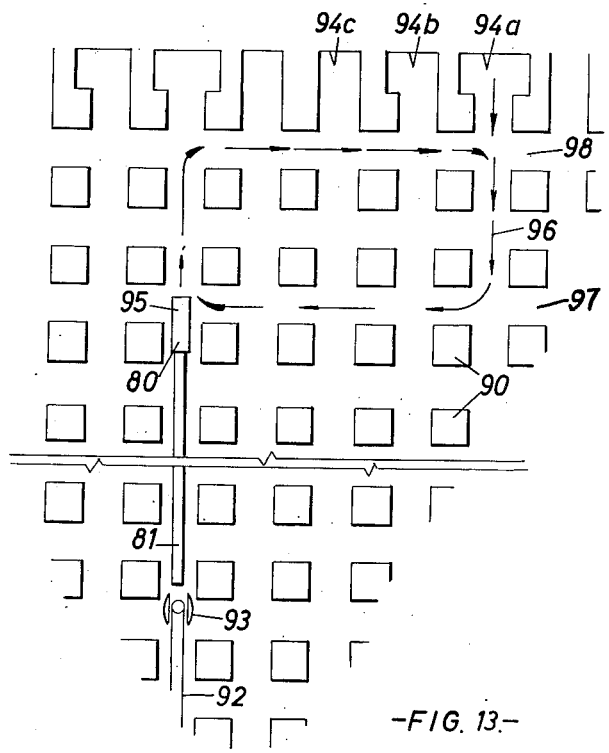
-FIG. 13.-
INVENTOR
Robert Gilmour McCammont
BY
Mead, Browne, Schuyler + Beveridge
ATTORNEY

United States Patent Office 3,058,605
Patented Oct. 16, 1962

3,058,605
LOADING AND TRANSPORT OF MINERALS IN MINES AND QUARRIES
Robert Gilmour McCammont, Penrith, England, assignor to The Long Meg Plaster & Mineral Co. Limited, Cocklakes, near Carlisle, England
Filed May 10, 1960, Ser. No. 28,036
18 Claims. (Cl. 214—110)

The present invention relates to loading and transport of minerals in mines and quarries either surface or underground.

The present invention is concerned with the problem of transferring minerals from the face to the permanent conveyor system of the mine or quarry. The term "Permanent Conveyor System" as used herein is defined as a conveyor system which is intended to remain fixed in position so long as that section or district of the mine which the system serves is in operation. The permanent conveyor system may comprise for example a conveyor some hundreds of yards in length in series with a longer tramway and the problem of the present invention resides in the transfer and loading of the mined mineral onto the adjacent end of the conveyor. In some mines, for example gypsum and anhydrite mines, this is done by means of transverse conveyors leading to the end of the permanent conveyor and a series of rope supported skip conveyors leading from the face to one or other of the transverse conveyors, the skips of the skip conveyor system being self-loading in that they are dragged through the rock pile.

A disadvantage of this system is that it is inflexible in the event of geological disturbances or zones of inferior mineral, making an alteration in layout desirable. Furthermore the equipment needs to be extended and resited at regular intervals as the mining proceeds.

In another system trailer vehicles drawn by tractors are loaded by relatively expensive loading machines of which a number of types are available.

The object of the present invention is to provide a less expensive yet flexible system of transferring and loading rock from the vicinity of the face onto the permanent conveyor system.

The present invention resides in a wheeled vehicle provided at each side with a rearwardly extensible, preferably telescopic, boom to the rear end of which is pivoted a radial boom, the two radial booms together supporting a tail pulley of a drag line loader having a skip for drawing the load up a tail board provided at the rear of the vehicle. The transverse position of the tail pulley can be adjusted by individual adjustment of the two telescopic booms.

The vehicle may be a tractor-drawn trailer vehicle and the winch gear for operating the drag line loader may be mounted on the forward end of the trailer and driven mechanically or hydraulically from a power take-off from the tractor.

The telescopic booms are preferably adjustable in elevation and in a prefered embodiment are pivoted to the vehicle at or near its rear end and are adjustable in elevation by hydraulic cylinders disposed towards the front end of the vehicle. This enables the tail pulley to be adjusted in height above the ground.

Whilst the invention may most economically be carried into effect with a trailer vehicle drawn by a tractor, it can also be applied to self-propelled vehicles. In the case of a mine face from 150 to 200 yards in width it is envisaged that six or seven vehicles according to the present invention may be used in conjunction with a single permanent conveyor system each vehicle operating on a given section of the face.

A preferred form of tractor or self-propelled vehicle for use in the present invention is one which can be unloaded without tipping such for example as a vehicle with a longitudinally transversible transverse wall which during loading is located at the forward end and can be traversed towards the rear end for unloading.

The invention includes an extensible boom assembly comprising a boom housing and a telescopic boom telescopically receivable therein, said boom housing comprising a cylindrical tube having angle-section members secured to the interior thereof along at least a substantial portion of its length, and said telescopic boom being of substantial polygonal cross section and having journalled to one end thereof wheels adapted to run on said angle-section members whilst wheels journalled to an open end of said boom housing are adapted to ride on the edges of the polygonal section telescopic boom. The telescopic boom is preferably of square cross section and is also preferably hollow to reduce the weight of the assembly and also for receiving a hydraulic cylinder for extending the assembly.

The invention is further described by way of example with reference to the accompanying drawings in which:

FIGS. 1, 2 and 3 are a side elevation, a plan view and a front elevation respectively of a vehicle according to the present invention, FIG. 4 is an elevation to a larger scale of a telescopic boom housing of the vehicle of FIGS. 1 to 3, FIG. 5 is a view in the direction of the arrow V of the boom housing of FIG. 4.

FIG. 6 is a section on the line VI—VI of FIG. 4.

FIG. 7 is an elevation of a telescopic boom which can be fitted in the boom housing of FIG. 4.

FIG. 8 is a view in the direction of the arrow VIII of FIG. 7 of the telescopic boom.

FIG. 9 is a diagrammatic sketch to a reduced scale showing in side elevation the vehicle of FIGS. 1 to 3 in use, FIG. 10 is a plan view of the vehicle as shown in FIG. 9, FIG. 11 is another plan view illustrating the tail pulley in a different transverse position.

FIG. 12 is a plan view illustrating the vehicle of FIGS. 1 to 3 being unloaded, and FIG. 13 is a diagrammatic plan view of part of an anhydrite or gypsum mine serving to illustrate the method by which a vehicle according to the present invention is used to load a conveyor system of the mine.

Referring first of all to FIGS. 1 to 3, the vehicle therein illustrated is a trailer vehicle intended to be tractor drawn. The vehicle has a single pair of wheels 141 and 142 and a draw bar 143 for coupling to a tractor. The trailer vehicle has outer side walls 101 and 102 and an outer forward transverse wall 103. Telescopic booms 104 and 105 can be rearwardly extended from boom housings 106 and 107 disposed outside side walls 101 and 102 respectively. For this purpose double-acting hydraulic cylinders 116 are contained partially within the telescopic booms 104 and 105 and have their forward ends connected to the forward ends of the boom housings 106 and 107 whilst their pistons are connected by piston rods 117 to the telescopic booms 104, 105 towards their rear end. The boom housings 106 and 107 are pivoted to the trailer vehicle towards its rear end by pivots 108 carried on framework 109. Radial booms 110, 111 are pivoted by pivots 112 and 113, lying in a substantially vertical plane, to the rear ends of the telescopic booms 104 and 105 respectively. The free ends of the radial booms 110 and 111 are pivoted to a pulley block 114 carrying a tail pulley 115 of a drag line loader. Treble-draw single-acting hydraulic cylinders 130 and 131 suspend the boom housings 106 and 107 from frameworks 132 and 133 mounted towards the forward end of the vehicle and serve for elevating the booms. A hydraulic cylinder 134 serves by a cable 135 to raise the tail board 120 to its position shown in FIG. 1.

The trailer vehicle has a tail board 120 hinged to the floor 121 of the vehicle. When the tail board 120 is lowered a skip 122 serves to drag the material to be loaded up the tail board 120 as will be described hereinafter. A cable 123 wound on a winch 124 serves to drag the skip 122 forward and a cable 125 wound on a winch 126 serves to drag the skip 122 rearward again. The cable 123 passes over a pulley 127 before being wound on the winch 124 whilst the cable 125 passes over the tail pulley 115 and a pulley 128 before being wound on the winch 126.

The vehicle has a longitudinally traversible transverse inner wall 136 which is shown in FIG. 1 in its forward position. In its forward position the inner wall 136 lies adjacent the outer forward transverse wall 103. The inner wall 136 is attached to inner side walls 137 and 138 which are rearwardly traversible with the transverse wall 136. For effecting traversing of the wall 136, double-acting hydraulic cylinders 139 arranged within suitable slots in the outer side walls 101 and 102 are attached to the forward end of the vehicle and have pistons attached by their piston rods to the rearward end of the inner side walls 137 and 138.

Power for the hydraulic cylinders can be obtained directly from a hydraulic pump on a tractor drawing the vehicle or by a hydraulic pump arranged on the trailer vehicle itself. Such a pump may be separately driven or may be driven from the power take-off of the tractor. The winches 124 and 126 are driven through a reduction gearing 140 from the power take-off of a tractor, but could also be hydraulically driven.

The boom housing 106 is shown in detail in FIGS. 4 to 6. The housing comprises a cylindrical tube 150 closed at its front end by a plate 151 and carrying at its rear end four diagonally disposed wheels 152 which are each provided at their periphery with a 90° V-groove. Small angle-section members 153 are secured to the inside of the tube 150 so as to extend in the vertical and horizontal axial planes of the boom housing. Lugs 154 are secured to the outside of the tube 150 and serve to receive the pivot 108. Lugs 155 secured to the inside of the plate 151 serve for the attachment of a hydraulic cylinder 116.

The telescopic boom 104 is shown in detail in FIGS. 7 and 8 of the drawings. The telescopic boom 104 comprises a substantially square section tube 160 to the forward end of which are journalled horizontally and vertically disposed wheels 161 each having in their periphery 90° V-grooves. A plate 162 carrying bearings 163 for receiving a pivot 112 is attached to the rear end of the square section tube 160. Lugs 164 within the tube 160 serve for attachment to the piston rod 117 of a hydraulic cylinder 116.

As can be seen in FIG. 5 the diagonally disposed wheels 152 cooperate with the four corners of the square section tube 160 of the telescopic boom whilst the vertically and horizontally disposed wheels 161 cooperate with the angle irons 153. Thus a simple construction is provided whereby the telescopic boom 104 can be accurately guided within the boom housing 106 with the required strength in service. The particular construction of boom and boom housing shown in FIGS. 4 to 8 assists in keeping the weight of the vehicle down to a minimum. The vehicle carries a considerable amount of machinery and in order that the vehicle may carry an economic pay load it is essential to keep the weight of such machinery as low as possible.

FIGS. 9 and 10 illustrate diagrammatically the trailer vehicle being loaded. The vehicle is drawn by a tractor 165 and when the vehicle has been backed into position both telescopic booms 104 and 105 are extended substantially their full amount to enable the tail pulley 115 to reach as far rearward as possible. The hydraulic cylinders 130 and 131 are supplied with hydraulic fluid under pressure to lower the forward end of the boom housings 106 and 107 and thereby raise the tail pulley 115 close to the roof 166 of the mine in which the vehicle is being operated. The tail board 120 is lowered and the trailer is then loaded with material from a heap 167 of material, such as gypsum or anhydrite, which has been blasted from the work face of the mine, by means of the drag line loader in a conventional manner.

FIG. 10 shows both booms 104 and 105 fully extended. However, as can be seen in FIG. 11, by partially retracting one of the telescopic booms, such as the boom 104, the tail pulley 115 can be moved somewhat to one side thereby enabling a different portion of the heap 167 of material to be worked. The ability to adjust the transverse position of the tail pulley 115 is very important as it enables different parts of the heap 167 to be worked with the trailer vehicle in a single position. Were it not possible to so adjust the tail pulley 115 it may well not be possible to obtain a full pay load with the trailer vehicle in one position. If it should become necessary to move the vehicle during loading then this will increase the time necessary to fully load the vehicle. An advantage of the twin boom arrangement is that the center of the trailer vehicle is open, allowing unhampered operation of the drag line loader. If a single central boom were used this would limit the maximum height to which the vehicle can be loaded by the skip. The use of two radial booms permits adjustment of the tail pulley in transverse position while avoiding the use of a further hydraulic cylinder.

It can be seen from FIG. 2 and also from FIGS. 10 and 11 that the radial booms 110 and 111 are pivoted to the pulley block 114 to enable the tail pulley 115 to align itself when the radial booms 110 and 111 are moved off centre as shown in FIG. 11. Metal blocks (not shown) are fitted to prevent excess movement of the pulley block 114 relatively to the radial booms 110 and 111.

When the vehicle is fully loaded the telescopic booms 104 and 105 are retracted and the tail pulley 115 is lowered under gravity by releasing hydraulic fluid from the cylinders 130 and 131. The vehicle is then towed away to the unloading point by the tractor 165.

An alternative method of raising the tail board 120 is illustrated in FIG. 9. A cam 168 is attached to the tail board 120 and cooperates with a pin 169 attached to the inner side wall 137. When the inner, side and front walls are in their fully forward position the pin 169 causes the tail board 120 to be raised. Thus, in order to lower the tail board 120 to the position shown in FIG. 9 it is necessary to rearwardly traverse the inner, side and front walls to a small extent by feeding hydraulic fluid to the appropriate ends of the cylinders 139.

FIG. 12 shows the vehicle being unloaded into a hopper 170 feeding a conveyor 171. The trailer vehicle is backed on to the hopper 170 and the tail board 120 is lowered within the hopper. The inner side walls 137, 138 and the inner front wall 136 are then rearwardly traversed by feeding hydraulic fluid to the appropriate end of the hydraulic cylinders 139 so as to push the load out of the vehicle into the hopper 170. During this unloading the telescopic booms are in their retracted position and the skip 122 is held in its outermost position so as not to hinder unloading.

FIG. 13 shows the manner in which a vehicle according to the invention can be utilised to advantage when working a gypsum or anhydrite mine. The mine is worked in a conventional manner leaving pillars 90 of gypsum or anhydrite to support the roof. Material blasted from a series of working faces such as 94a, 94b and 94c is carried by vehicles according to the invention to a loading point 95 where it is discharged on the feed conveyor 80, feeding the conveyor belt 81. The track of a vehicle serving working face 94a is shown by arrows 96. When the vehicle is loaded it is driven to the feeding point 95 along the corridor 97. The vehicle is then backed on to the feeding point 95 for unloading and returns to the working faces 94a along the corridor 98. Similarly, vehicles serving the other working faces such as 94b and 94c can be loaded and unloaded, in each case the vehicle when loaded using the corridor 97 and when unloaded using the corridor 98. In this way there need be little interference between one vehicle and another. The conveyor belt 81 feeds an endless rope hauler 92 at tub-loading point 93. The hauler 92 carries the material out of the mine.

I claim:

1. In combination: a wheeled vehicle, a rearwardly extending extensible boom at each side of said vehicle, a radial boom pivoted by one end to the rear end of each of said extensible booms, a pulley block pivoted to the other ends of said radial booms, a drag line loader tail pulley journalled in said pulley block, means for individually adjusting the extension of each of said extensible booms thereby enabling the rearward extent of said tail pulley from said vehicle and also the transverse position of said tail pulley relative to said vehicle to be adjusted, and a tail board hinged to said vehicle.

2. In combination: a wheeled vehicle, a rearwardly extending extensible boom at each side of said vehicle, a radial boom pivoted by one end to the rear end of each of said extensible booms, a pulley block pivoted to the other ends of said radial booms, a tail pulley journalled in said pulley block, means for individually adjusting the extension of each of said extensible booms thereby enabling the lateral position of said tail pulley to be adjusted, means for adjusting the elevation of said extensible booms thereby enabling the height of said tail pulley above the ground to be adjusted, a tail board hinged to said vehicle, a skip, and winch means having a first cable attached to said skip for drawing a skip load up said tail board and a second cable passing around said tail pulley for drawing said skip rearwardly.

3. In combination: a trailer vehicle adapted to be tractor drawn, two rearwardly extending extensible booms one being disposed on each side of said vehicle and each being pivoted to said vehicle, hydraulic piston and cylinder means for adjusting the elevation of said extensible booms, two radial booms each being hinged by one end to the rear end of a respective extensible boom, a pulley block hinged to the other ends of said radial booms, a tail pulley journalled in said pulley block, individual hydraulic piston and cylinder means associated with each of said extensible booms for adjustably extending each of said extensible booms, a tail board hinged to the rear end of said vehicle, a skip, winch means mounted on the forward end of said vehicle, a first cable from said winch means to said skip for drawing a skip load up said tail board, and a second cable from said winch means around said tail pulley to said skip for drawing said skip rearwardly.

4. The combination according to claim 3 further comprising rotary coupling means coupling said winch means to a power take-off of a tractor.

5. The combination according to claim 3 wherein said winch means is hydraulic.

6. In combination: a wheeled vehicle, rearwardly extending twin telescopic booms, one telescopic boom being disposed each side of said vehicle, twin radial booms hinged at one end respectively to the rear ends of said twin telescopic booms about generally vertical axes, a drag line loader tail pulley journalled at the other ends of said twin radial booms, means within each of said twin telescopic booms for individually extending said telescopic booms, and a tail board hinged to said vehicle.

7. In combination: a wheeled vehicle, rearwardly extending twin extensible booms hinged to said vehicle about a horizontal transverse axis at points rearward of said vehicle, hydraulic piston and cylinder means forward of said vehicle for adjusting the elevation of said twin extensible booms, twin radial booms hinged by one end respectively to said twin extensible booms, a drag line loader tail pulley journalled at the other ends of said radial booms, hydraulic piston and cylinder means for individually adjusting the rearward extent of each of said twin extensible booms and a tail board hinged to the rear end of said vehicle.

8. In combination: a wheeled vehicle, a hollow cylindrical boom housing extending fore-and-aft at each side of said vehicle, a hollow telescopic boom rearwardly extensible from within each boom housing, piston and cylinder means within each boom housing and partially within each telescopic boom for individually adjusting the rearward extent of said telescopic booms, a radial boom journalled by one end to the rearward end of each of said telescopic booms, a drag line loader tail pulley journalled at the other ends of said radial booms, and a tail board hinged to the rear end of said vehicle.

9. A tractor-drawn vehicle comprising in combination: a vehicle frame having a floor, side walls and a front wall, a tail board pivoted to said floor at the rear of said vehicle frame, a pair of wheels journalled to said vehicle frame, a draw bar attached to the forward end of said vehicle frame and adapted to be coupled to a tractor, twin rearwardly extending extensible booms, one extensible boom being disposed on each side of said vehicle frame outside said side walls, means for individually adjusting the rearward extent of said twin extensible booms, twin radial booms hinged by one end about generally vertical axes respectively to the rear ends of said twin extensible booms, a pulley block hinged to the other ends of said twin radial booms, a tail pulley journalled in said pulley block, a skip, winch means disposed at the forward end of said vehicle frame outside said front wall, a first cable from said winch means to said skip for drawing a load up said tail board, and a second cable from said winch means about said tail pulley to said skip for drawing said skip rearwardly.

10. A vehicle according to claim 9 further comprising means for raising said tail board.

11. A vehicle according to claim 9 wherein said twin extensible booms are pivoted to said vehicle frame about a horizontal transverse axis and further comprising hydraulic piston and cylinder means for adjusting the elevation of said twin extensible booms.

12. In combination: a wheeled vehicle, a tail board hinged to said vehicle, a hollow cylindrical boom housing extending fore-and-aft of said vehicle and having an open end at its rear, circumferentially spaced rails secured to the interior of said boom housing and extending along at least a substantial portion of its length, a telescopic boom of substantially polygonal cross section receivable in said boom housing, wheels journalled to a forward end of said telescopic boom and adapted to run on said rails, wheels journalled to said boom housing at its rear open end and adapted to ride on the edges of said polygonal section telescopic boom whereby said telescopic boom can be telescoped within said cylindrical boom housing, means for adjusting the rearward extent of said telescopic boom, a drag line loader tail pulley carried from the rear end of said telescopic boom, a drag line loader skip, winch means mounted on said vehicle, a first cable from said winch means to said skip for drawing a skip load up said tail board, and a second cable from said winch means around said tail pulley to said skip for drawing said skip rearwardly.

13. In combination: a wheeled vehicle, a tail board hinged to said vehicle, a hollow cylindrical boom housing extending fore-and-aft of said vehicle and having an open rearward end, four equi-circumferentially spaced angle-section members secured to the interior of said boom housing and extending along at least a substantial portion of its length, a hollow telescopic boom of substantially square cross section receivable in said boom housing, wheels journalled to a forward end of said telescopic boom and adapted to run on said angle-section members, wheels journalled to said boom housing at said rear open end thereof and adapted to ride on the edges of the square section telescopic boom, hydraulic piston and cylinder means within said boom housing and partially within said telescopic boom and coupled between said boom housing and said telescopic boom for adjusting the rearward extent of said telescopic boom, a drag line loader tail pulley journalled from the rear end of said telescopic boom, a drag line loader skip, winch means mounted on said vehicle, a first cable from said winch means to said skip for drawing a skip load up said tail board, and a second cable from said winch means around said tail pulley to said skip for drawing said skip rearwardly.

14. The combination according to claim 13 wherein said angle-section members are disposed directly above and below and at each side of the axis of said cylindrical boom housing, and in which said telescopic boom is disposed with its sides substantially vertical and generally horizontal.

15. In combination: a wheeled vehicle, a hollow cylindrical boom housing extending fore-and-aft to each side of said vehicle whilst being pivoted thereto about a substantially horizontal transverse axis and having an open rearward end, circumferentially spaced angle-section members secured to the interior of each of said boom housings and extending along at least a substantial portion of the length thereof, two hollow telescopic booms of polygonal section receivable respectively in said hollow boom housings, wheels journalled to a forward end of each of said telescopic booms and adapted to run on said angle-section members, wheels journalled to said boom housings at said rearward open ends thereof and adapted to ride on the edges of said polygonal section telescopic booms, individual hydraulic piston and cylinder means within each of said boom housings and partially within the respective telescopic booms for adjusting the rearward extent of said telescopic booms, two radial booms each journalled by one end to the rear end of a respective one of said telescopic booms, a tail pulley journalled at the other ends of said radial booms, hydraulic piston and cylinder means for adjusting the elevation of said boom housings and thereby the height of said tail pulley above the ground, a skip, a tail board hinged to said vehicle at the rear end thereof, winch means disposed at the forward end of said vehicle, a first cable from said winch means to said skip for drawing a skip load up said tail board, and a second cable from said winch means around said tail pulley to said skip for drawing said skip rearwardly.

16. The combination according to claim 15 wherein said boom housings are pivoted to said wheeled vehicle about an axis which is rearward of said vehicle and said piston and cylinder means for adjusting the elevation of said boom housings are disposed forward of said vehicle.

17. In a drag line loader having a skip, winch means, a tail pulley, a first cable from the skip to said winch means for advancing the skip with the skip load and a second cable from the skip around said tail pulley to said winch means for drawing said skip rearwardly, the combination comprising a pair of extensible booms, means mounting said extensible booms in generally parallel and horizontal disposition, a radial boom pivoted by one end to the extending end of each of said extensible booms, a pulley block pivoted to the other ends of said radial booms, said tail pulley being journalled in said pulley block, and means for individually adjusting the extension of each of said extensible booms.

18. A drag line loader according to claim 17 further comprising means for adjusting the elevation of said extensible booms.

References Cited in the file of this patent

UNITED STATES PATENTS

| | | |
|---|---|---|
| 2,268,568 | Cook | Jan. 6, 1942 |
| 2,344,742 | Shields et al. | Mar. 21, 1944 |
| 2,740,535 | Bill | Apr. 3, 1956 |
| 2,819,803 | Obenchain | Jan. 14, 1958 |
| 2,868,392 | Poffenberger | Jan. 13, 1959 |